United States Patent [19]

Skyllas-Kazacos et al.

[11] Patent Number: 4,786,567
[45] Date of Patent: Nov. 22, 1988

[54] ALL-VANADIUM REDOX BATTERY

[75] Inventors: Maria Skyllas-Kazacos, Sylvania Heights; Miron Rychick, Bankstown; Robert Robins, Lindfield, all of Australia

[73] Assignee: Unisearch Limited, Australia

[21] Appl. No.: 145,640

[22] Filed: Jan. 12, 1988

Related U.S. Application Data

[63] Continuation of Ser. No. 849,094, Apr. 7, 1986, abandoned.

[30] Foreign Application Priority Data

Feb. 11, 1986 [AU] Australia ............................. PH4536

[51] Int. Cl.4 ............................................. H01M 8/20
[52] U.S. Cl. ....................................... 429/19; 429/105; 429/14; 429/51; 429/203; 429/205
[58] Field of Search ................. 429/105, 101, 106–109, 429/12–14, 17, 19, 51, 72, 203–205

[56] References Cited

U.S. PATENT DOCUMENTS

| | | | |
|---|---|---|---|
| 2,649,766 | 8/1953 | Johnson | 429/202 X |
| 3,540,933 | 11/1970 | Boeke | 429/105 X |
| 3,996,064 | 12/1976 | Thaller | 429/21 X |
| 4,220,690 | 9/1980 | Blurton et al. | 429/15 |
| 4,370,392 | 1/1983 | Savinell et al. | 429/105 X |
| 4,485,154 | 11/1984 | Remick et al. | 429/105 X |
| 4,543,302 | 9/1985 | Gahn et al. | 429/15 |
| 4,576,878 | 3/1986 | Gahn | 429/109 X |

Primary Examiner—Anthony Skapars
Attorney, Agent, or Firm—Townsend and Townsend

[57] ABSTRACT

Charged and uncharged all-vanadium redox batteries are disclosed. Also described are a process for charging the uncharged battery and a process for producing electricity from the charged battery. A process for recharging an all-vanadium redox battery which has been at least partially discharged is also disclosed.

110 Claims, 5 Drawing Sheets

ALL-VANADIUM REDOX BATTERY

This is a continuation of application Ser. No. 06/849,094, filed 4/7/86, now abandoned.

This invention relates to an all-vanadium redox battery, an uncharged all-vanadium redox battery, a process for charging an all-vanadium redox battery, a process for re-charging an all-vanadium redox battery, a process for the production of electricity from an all-vanadium redox battery and all-vanadium redox battery systems.

In this specification the term "catholyte" refers to an electrolyte containing specified redox ions which are in an oxidised state and are to be reduced during the discharge process of a redox battery or are in a reduced state and are to be oxidised during the charging process of the redox battery or which are a mixture of these oxidised ions and ions to be oxidised. The term "anolyte" refers to an electrolyte containing specified redox ions which are in a reduced state and are to be oxidised during the discharge process of a redox battery or are in an oxidised state and are to be reduced during the charging process of a redox battery or which are a mixture of these latter reduced ions and ions to be reduced. Further, aqueous HCl is not included within the scope of "catholyte" and aqueous NaOH is not included within the scope of "anolyte".

A suitable energy storage system is an essential requirement for remote power system applications that are supplied by either photovoltaic arrays or wind turbine generators. For such applications, low life-cycle cost and simplicity of operation are the major requirements.

The supply of domestic and industrial electric power is presently generally provided by thermal, hydroelectric and nuclear power plants. Hydroelectric power plants are capable of responding rapidly to power consumption fluctuations and their outputs are generally controlled to respond to changes in power requirements. However the number of hydroelectric power plants that can be built is limited to the number of prospective sites. Thermal and nuclear power plants which are not easily adapted to respond to power requirements are typically run at maximum ore near maximum capacity. Excess power generated by these latter plants can be stored via pump-up storage power plants but these require critical topographical conditions and therefore the number of prospective sites is determined by the available terrain.

Rechargeable batteries are an attractive option. In particular, redox energy storage systems have recently received considerable attention as they promise to be inexpensive and possess many features that provide for long life, flexible design, high reliability, and low operation and maintenance costs.

A major problem with redox batteries is the diffusion of cations through the membrane which separates the catholyte in the positive compartment from the anolyte in the negative compartment.

For a number of years now, the NASA-Lewis Research Centre has been involved in the development of a complete redox energy storage system based on the Fe(III)/(II) and Cr(III)/(II) couples for the positive and negative sides of the battery, respectively [see for example Redox Flow Cell Development and Demonstration Project, NASA TM-79067, National Aeronautics and Space Administration, U.S. Dept. of Energy, 1979, J. Giner. L. Swette and K. Cahill, NASA TM-19760, National Aeronautics and Space Administration, U.S. Dept. of Energy, 1976, L. H. Thaller, NASA TM-79143, National Aeronautics and Space Administration, U.S. Dept. of Energy, 1979, N. H. Hagedorn and L. H. Thaller, NASA TM-81464, National Aeronautics and Space Administration, U.S. Dept. of Energy, 1980, D. A. Johnson and M. A. Reid, NASA TM-82913, National Aeronautics and Space Administration, U.S. Dept. of Energy, 1982, and N. H. Hagedorn, Ext. Abstr. No. 19, Fall Meeting, Electrochem. Soc., 1983, p. 30].

A major aspect of the NASA redox energy storage project has been the development of a highly efficient ion-exchange membrane to impede the passage of iron and chromium ions and yet allow easy passage of chloride and hydrogen ions. Whilst this membrane has reduced the cation diffusion problem at low temperatures, the practical necessity to operate the redox cell at elevated temperatures, so as to improve the kinetics of the chromium charging reaction has greatly diminished the ability of the membranes to keep the reactant species separate. To overcome this, NASA has recently begun to employ pre-mixed reactants, so that in the fully-discharged state, both reactant solutions contain, for example, 1M $FeCl_2$, 1M $CrCl_3$ and 2M HCl as described by N. H. Hagedorn, ibid. Although this has eliminated the problem of cation migration, other complications could arise from the use of pre-mixed reactant solutions. The deposition of iron at the negative electrode during charging would be one example.

The use of a single-metal system by both the negative and positive halves of the cell has been proposed by N.H. Hagedorn, ibid., and would certainly overcome the problem of cross-contamination as well as any problems associated with the use of pre-mixed solutions (see D. A. Johnson and M. A. Reid, ibid.). Cr(III) has been suggested for such a cell by N. H. Hagedorn, ibid., but the Cr(IV)/Cr(III) couple showed poor electrochemical behaviour in an investigation by D. A. Johnson and M. A. Reid, Chemical and Electrochemical Behaviour of the Cr(III)/Cr(II) Half Cell in the NASA Redox Energy Storage System, DOE/NASA/12726-17, NASA TM-82913, 1982, 17 pp.

Y. W. D. Chen, K. S. V. Santhanam and A. J. Bard, Journal of the Electrochemical Society, 129 (1982) 61 have investigated a number of Co complexes but the ligands employed in their study displayed poor stability for the Co(I) species.

A preliminary study of all-vanadium and part-vanadium redox couples was conducted and reported in Redox Flow Cell Development and Demonstration Project, NASA, ibid. Their results indicated that V(V)/V(IV) and V(IV)/V(III) couples generally exhibited irreversible behaviour although the reversibility of V(III)/V(II) on a $B_4C$ electrode was better than that of Cr(III)/V(II).

The difference in standard reduction potentials exhibited by V(III)/V(II) of $-0.291$ V VS SHE (in 3M $H_2SO_4$) versus $\sim 1.0$ V VS SHE for V(V)/V(IV) make the development of an all-vanadium redox cell a worthwhile consideration. However despite this voltage difference, as far as the present inventors are aware there has not been any attempt to develop an all-vanadium redox battery. Setting the relatively poor oxidation/reduction characteristics at known electrodes of both vanadium redox couples aside, presumably the lack of interest in developing an all-vanadium redox battery has been due to two noteworthy obstacles to making a practical all-vanadium redox cell.

The first obstacle is the known lack of stability of the V(IV) and V(V) species in some common electrolytes. V(V) is unstable in HCl solutions, the V(V) being reduced by the Cl$^-$ ion to V(IV) (see C. D. Coryell and D. M. Yost, Journal of the American Chemical Society 7 (1964) 116). In addition V(IV) has been reported to be unstable in NaOH solutions by R. J. H. Clark, The Chemistry of Titanium and Vanadium, Elsevier, Amsterdam, 1968 pp. 15–127, the V(IV) being slowly oxidised to V(V).

The second obstacle is the solubility of V(V) compounds such as $V_2O_5$. The present inventors have found that the rate of dissolution of $V_2O_5$ is very low at room temperature. For example, with sonification, 0.5 g $V_2O_5$ in 100 ml 1.8M $H_2SO_4$ required approximately 3–4 h to dissolve completely. The solubility limit of $V_2O_5$ in 1.8M $H_2SO_4$ was estimated by preparing a series of solutions of different concentrations and noting the appearance of such over a period of time. After 12 days, complete dissolution was observed for 1 g $V_2O_5$ per 100 ml, while 2 g per 100 ml required 30 days for complete dissolution. This problem of slow dissolution of $V_2O_5$ in acids, is often dealt with by first dissolving in NaOH solution and then acidifying the solution (see G. Bengtsson, Acta Chem. Scand., 26 (1972) 2494). However from a redox cell point of view the use of NaOH is undesirable due to the additional cost.

An object of this invention is to provide an all-vanadium redox battery, an uncharged all-vanadium redox battery and all-vanadium redox battery systems which ameliorate the diffusion, stability and solubility problems of the prior art.

Another object is to provide processes for charging, recharging and producing electricity from, an all-vanadium redox battery in which the diffusion, stability and solubility problems of the prior art are ameliorated.

The inventors have discovered that tetravalent and pentavalent vanadium ions are stable in electrolytes such as aqueous $H_2SO_4$, trivalent vanadium ions exhibit stability in de-aerated $H_2SO_4$ and divalent vanadium ions are stable in sealed and de-aerated $H_2SO_4$. The inventors have also discovered that at least 2M pentavalent vanadium ions can be prepared in solution in an electrolyte such as an 2M $H_2SO_4$.

Accordingly, in a first embodiment this invention provides an all-vanadium redox battery having a negative compartment containing an anolyte (as herein defined) having a trivalent/divalent vanadium redox system in electrical contact with a negative electrode and a positive compartment containing a catholyte (as herein defined) having a pentavalent/tetravalent vanadium redox system in electrical contact with a positive electrode, and an ionically conducting separator disposed between the positive and negative compartments and in contact with the catholyte and anolyte to provide ionic communication therebetween.

In a second embodiment this invention provides an uncharged all-vanadium redox battery having a positive compartment containing a catholyte having tetravalent vanadium ions in electrical contact with a positive electrode and a negative compartment containing an anolyte having tetravalent vanadium ions in electrical contact with a negative electrode; and an ionically conducting separator disposed between the positive and negative compartments and in contact with the catholyte and anolyte to provide ionic communication therebetween.

In a third embodiment this invention provides a process for charging an all-vanadium redox battery having a positive compartment containing an anolyte having tetravalent vanadium ions in electrical contact with a negative electrode and a positive compartment containing a catholyte having tetravalent vanadium ions in electrical contact with a positive electrode; and an ionically conducting separator disposed between the positive and negative compartments and in contact with the catholyte and anolyte to provide ionic communication therebetween which process comprises providing electrical energy from an external circuit to the positive and negative electrodes to derive divalent vanadium ions in the anolyte and pentavalent vanadium ions in the catholyte.

The invention includes charged or partially charged all-vanadium redox battery produced by the above charging process.

In a fourth embodiment this invention provides a process for recharging an at least partially discharged all-vanadium redox battery having a negative compartment containing an anolyte having a trivalent/divalent vanadium redox system in electrical contact with a negative electrode and a positive compartment containing a catholyte having a pentavalent/tetravalent vanadium redox system in electrical contact with a positive electrode, and an ionically conducting separator disposed between the positive and negative compartments and in contact with the catholyte and anolyte to provide ionic communication therebetween which process comprises providing electrical energy from an external circuit to the positive and negative electrodes to derive divalent vanadium ions in the anolyte and pentavalent vanadium ions in the catholyte.

The invention further includes an all-vanadium redox battery produced by the above re-charging process.

In a fifth embodiment this invention provides a process for the production of electricity from an all-vanadium redox battery having a negative compartment containing an anolyte having a trivalent/divalent vanadium redox system in electrical contact with a negative electrode and a positive compartment containing a catholyte having a pentavalent/tetravalent vanadium redox system in electrical contact with a positive electrode, and an ionically conducting separator disposed between the positive and negative compartments and in contact with the catholyte and anolyte to provide ionic communication therebetween which process comprises withdrawing electrical energy from the redox battery by loading an external circuit in electronic communication with the positive electrode and negative electrode.

An all-vanadium redox battery system may be assembled from the all-vanadium redox battery of the first or second embodiments by including an anolyte reservoir for further anolyte having anolyte supply and return lines between the anolyte reservoir and the negative compartment, a catholyte reservoir for further catholyte having catholyte supply and return lines between the catholyte reservoir and the positive compartment; and pumping means associated with the anolyte lines and with the catholyte lines for pumping the anolyte between the negative compartment and the anolyte reservoir and for pumping the catholyte between the positive compartment and the catholyte reservoir.

Another all-vanadium redox battery system may be assembled from the all-vanadium redox battery of the first or second embodiments by including an anolyte charge reservoir having anolyte charge supply and return line or lines for charging further anolyte which is to be delivered to the negative compartment and a catholyte charge reservoir having catholyte charge supply and return line or lines for charging further catholyte which is to be delivered to the positive compartment an anolyte storage reservoir having anolyte storage supply and return line or lines for storing anolyte from the negative compartment and a catholyte storage reservoir having catholyte storage supply and return line or lines for storing catholyte from the positive compartment and pumping means associated with the anolyte storage line or lines and/or the anolyte charge line or lines and with the catholyte storage line or lines and/or the catholyte charge line or lines for pumping:

(i) the catholyte through the catholyte storage line or lines, the positive compartment and the catholyte charge line or lines; and (ii) the anolyte solution through the anolyte solution storage line or lines, the negative compartment and the anolyte solution charge line or lines.

Preferably the electrolyte for the anolyte and catholyte is an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof or other like electrolytes. Aqueous $H_2SO_4$ having a concentration in the range 0.01M to 5M is preferred. It is even more preferred that $H_2SO_4$ concentration 0.01M to 2.5M and even more preferably 0.01M to 2M is used.

A trivalent/divalent vanadium redox system can be prepared by dissolving $VCl_3$ in aqueous $H_2SO_4$ and electrochemically reducing at least a portion of the trivalent vanadium ions to divalent vanadium ions. The reduction is typically carried out in 2M $H_2SO_4$ which has been de-aerated and is in a sealed compartment.

A pentavalent/tetravalent vanadium redox system can be prepared by dissolving vanadium pentoxide in 2M $H_2SO_4$. The pentavalent vanadium ions are reduced to tetravalent vanadium ions in the positive compartment during discharging of a redox battery of the invention.

More preferably said anolyte and said catholyte are prepared by preparing a 0.1M to 2M $VOSO_4$ in 0.1M to 5M $H_2SO_4$ to form tetravalent vanadium ions, electrochemically reducing at least a portion of said tetravalent vanadium ions to form said anolyte which consists of trivalent/divalent vanadium ion mixture or a solution of divalent vanadium ions, and electrochemically oxidising at least a portion of said tetravalent vanadium ions to form said catholyte which consists of a solution of pentavalent vanadium ions.

Preparing the catholyte by dissolving $VOSO_4$ in an aqueous solution of $H_2SO_4$ and oxidising the resultant tetravalent vanadium ions to pentavalent vanadium ions is particularly advantageous since at least 2M pentavalent vanadium ions can be prepared in solution in 2M $H_2SO_4$ compared with an upper limit of about 0.1M pentavalent vanadium ions which can be prepared by directly dissolving vanadium pentoxide in 2M $H_2SO_4$. The increased concentration of pentavalent vanadium ions means that the redox battery has a correspondingly increased capacity for a given catholyte volume.

Another advantage of preparing the anolyte and catholyte in this manner is divalent vanadium ions are stable in sealed de-aerated $H_2SO_4$ whilst trivalent vanadium ions resulting from the oxidation of the divalent ions are also stable in de-aerated $H_2SO_4$. In addition, tetravalent and pentavalent vanadium ions have been found to be stable in $H_2SO_4$.

The negative and positive electrodes can be graphite, glassy carbon, carbon fibre material (non-woven, type CFT-3000 Ahlstroem Finland) cellulose carbon knit (GF-20, Nikon Carbon Company Limited, Japan) platinised titanium, Pt, Au, Pb, $RuO_2$, dimensionally stabilized anodes such as noble metal doped $TiO_2$, $RuO_2$ or $IrO_2$ or combinations thereof, conductive polymer coatings or other like materials. Platinised titanium and carbon cloth GF-20 are preferred materials for the positive electrode and graphite is a preferred material for the negative electrode.

The ionically conducting separator can be a sulphonated polyethylene membrane or polystyrene sulphonic acid membrane or other like membrane. A polystyrene sulphonic acid membrane is preferred.

A non-aqueous electrolyte such as room temperature molten salt aluminium chloride-butyl pyridinum chloride can also be used.

An all-vanadium redox battery of the invention can be operated over the broad temperature range $-5°$ C. to $99°$ C.

An advantage of the all-vanadium redox battery of this invention is that if some cross-mixing of the anolyte and catholyte occurs the regeneration of the solution can be simply effected by charging the battery. In mixed metal redox systems used in prior redox batteries cross-contaminated anolyte and catholyte are replaced or regenerated by removing and externally treating the solutions.

Preferably the anolyte includes trivalent vanadium ions:divalent vanadium ions in the concentration range from a trace:5.0M to 5.0M:a trace and the catholyte includes pentavalent vanadium ions:tetravalent vanadium ions in the concentration range from a trace:5.0M to 5.0M:a trace.

More preferably the anolyte includes trivalent vanadium ions:divalent vanadium ions in the concentration range from a trace:2.5M to 2.5M:a trace and the catholyte includes pentavalent vanadium ions:tetravalent vanadium ions in the concentration range from a trace:2.5M to 2.5M:a trace.

Even more preferably the anolyte comprises trivalent vanadium ions:divalent vanadium ions in the concentration range from a trace:2.0M to 2.0M:a trace and the catholyte comprises pentavalent vanadium ions:tetravalent vanadium ions in the concentration range from a trace:2.0M to 2.0M:a trace.

It is preferred that the electrolyte includes sulphate anions associated with said divalent vanadium ions, said trivalent vanadium ions, said tetravalent vanadium ions and said pentavalent vanadium ions.

Preferably the catholyte includes a salt of the formula $VO(X)_y$ where y is 2 and X is selected from F, Br or Cl or y is 1 and X is selected from $SO_4$ or O.

The anolyte can also include of a salt of the formula $VO(X)_y$.

The preferred concentration of the salt is from 0.01M to 5M, more preferably from 0.1M to 2.5M and even more preferably 0.01M to 2.0M.

Preferably the negative compartment is sealed air-tight and the anolyte is de-aerated.

It is also preferred that the positive compartment is sealed air-tight and the catholyte is de-aerated.

BRIEF DESCRIPTION OF THE DRAWINGS

This invention will now be described by way of example with reference to the drawings in which.

Curves (a') and (b')—as above, except that *positive* graphite electrode replaced with DSA electrode (Iridium oxide on Titanium-Diamong Shamrock). Curves correspond to the *second* charge and discharge cycles.

DETAILED DESCRIPTION OF THE DRAWINGS

Figure 1:
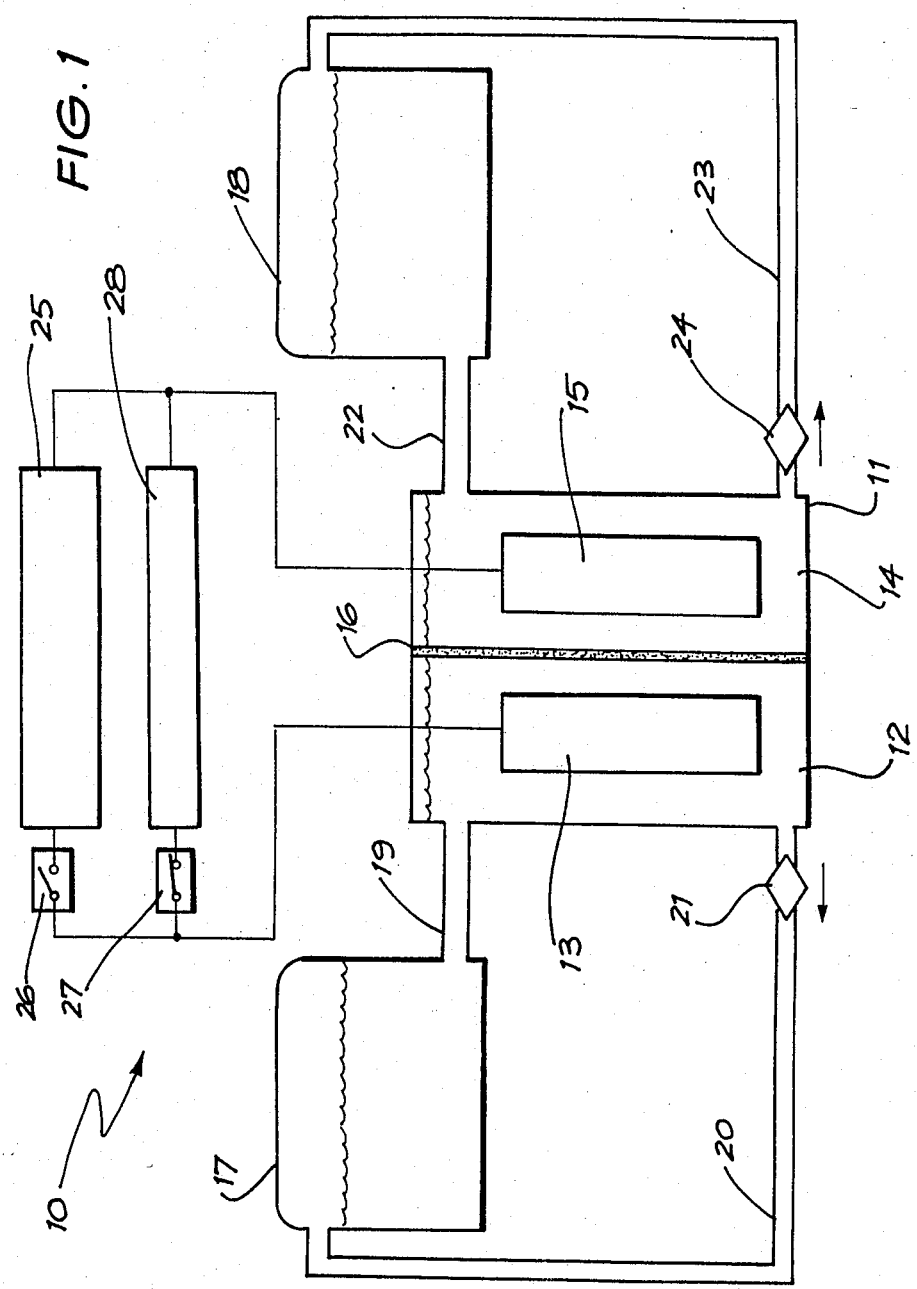
FIG. 1 is a block diagram of an all-vanadium redox battery system having an anolyte reservoir and catholyte reservoir.

Referring to FIG. 1 an all-vanadium redox battery system 10 includes a redox battery 11 which has a negative compartment 12 with a negative electrode 13 and a positive compartment 14 with a positive electrode 15. Negative compartment 12 contains an anolyte in electrical contact with negative electrode 13 and positive compartment 14 contains a catholyte in electrical contact with positive electrode 15.

Battery 11 includes ionically conducting separator 16 disposed between positive and negative compartments 12, 14 and in contact with the catholyte and anolyte to provide ionic communication therebetween. The anolyte and catholyte are prepared by dissolving $VOSO_4$ in aqueous $H_2SO_4$ to form a solution of tetravalent vanadium ions and this solution is loaded into anolyte reservoir 17 and negative compartment 12 and catholyte reservoir 18 and positive compartment 14. The anolyte is then pumped through negative compartment 12 and anolyte reservoir 17 via anolyte supply and return lines 19, 20 by pump 21 and simultaneously the catholyte is pumped through positive compartment 14 and catholyte reservoir 18 via catholyte supply and return lines 22, 23 by catholyte pump 24. Battery 11 is then charged by providing electrical energy from power source 25 to positive and negative electrodes 13, 15 by closing switch 26 and opening switch 27 to derive divalent vanadium ions in the anolyte and pentavalent vanadium ions in the catholyte.

Electricity is produced from battery 11 by opening switch 26 closing switch 27 and withdrawing electrical energy via load 28 which is in electronic communication with negative and positive electrodes 13, 15.

Battery 11 is re-charged by opening switch 27, closing switch 26 and providing electrical energy from power source 25 to derive divalent vanadium ions in the anolyte and quinvalent vanadium ions in the catholyte. Any cross-contamination between the anolyte and catholyte is rectified during the recharging process.

One advantage of the all-vanadium redox battery system is that the divalent, trivalent, tetravalent and pentavalent vandium ions are relatively stable in de-aerated and sealed aqueous sulphuric acid.

Figure 2:
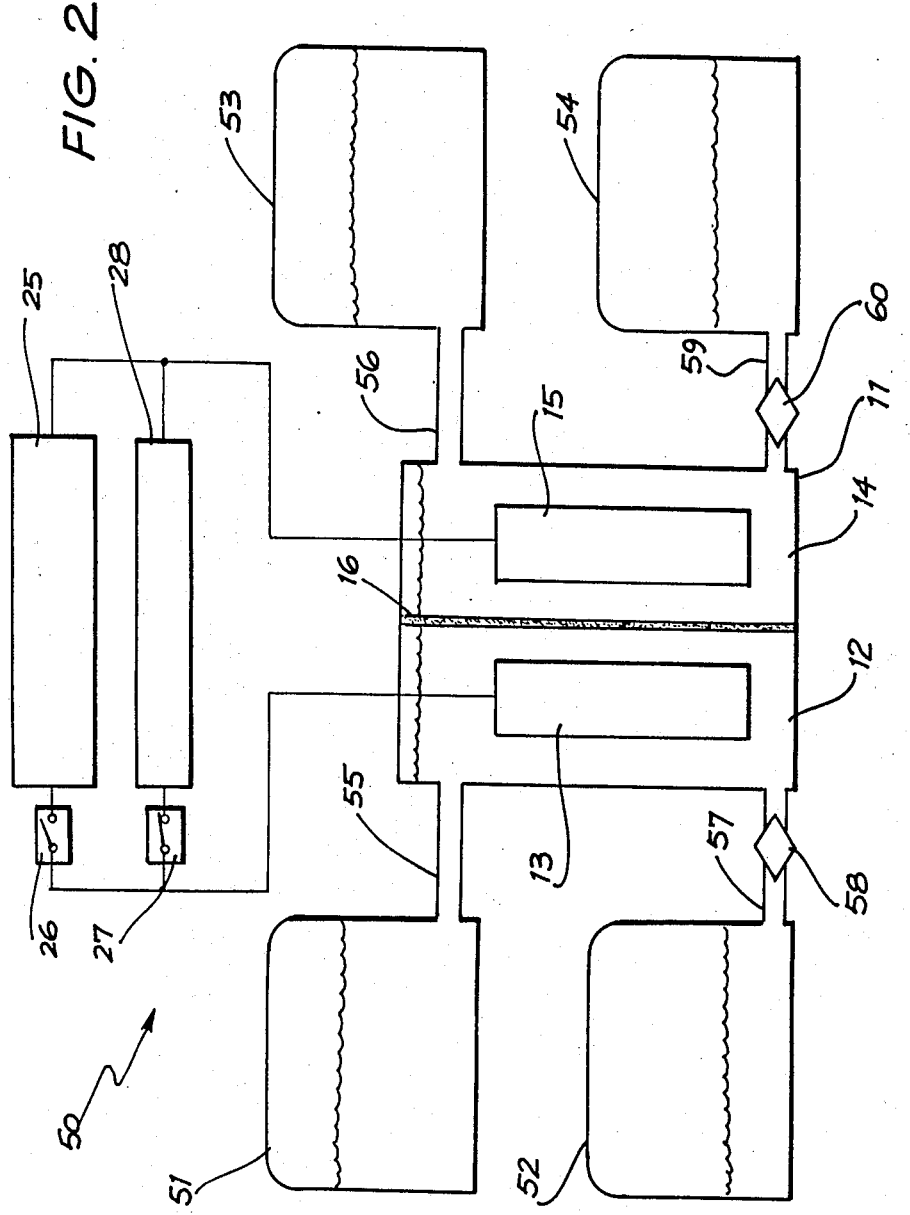
FIG. 2 is a block diagram of a redox battery system having anolyte and catholyte charge reservoirs and anolyte and catholyte storage reservoirs.

Referring to FIG. 2 an alternatively-configured all-vanadium redox battery system 50 includes battery 11, power source 25 and load 28 of FIG. 1 but anolyte and catholyte reservoir 17, 18 of FIG. 1 have been replaced by anolyte charge and storage reservoirs 51, 52 and catholyte charge and storage reservoirs 53, 54 respectively. Anolyte charge reservoir 51 delivers/receives further anolyte to or from negative compartment 12 via anolyte charge supply return line 55 and similarly catholyte charge reservoir 53 delivers/receives catholyte to or from positive compartment 14 via catholyte charge supply/return line 56. Anolyte is pumped from or to negative compartment 12 to or from anolyte storage reservoir 52 via anolyte storage supply/return line 57 by pump 58 and analogously catholyte is pumped from or to positive compartment 14 to or from catholyte storage reservoir 54 via catholyte storage supply/return line 56 by pump 60.

The charging, recharging and electricity production processes of battery system 50 are carried out in a similar way to those described for battery system 10 except that the processes in negative and positive compartments 12, 14 are performed as batch processes rather than the re-circulation procedure of battery system 10.

EXAMPLE 1

Figure 3:
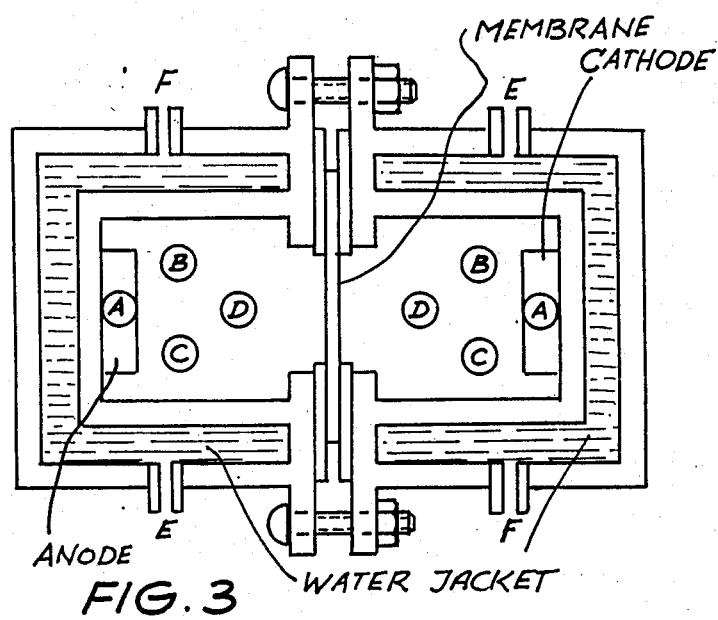
FIG. 3 is a top view of a laboratory scale redox battery in which: A-electrode contacts; B-nitrogen inlet; C-nitrogen outlet; D-reference electrode or thermometer; E-water inlet from thermostat and F-water outlet.

A series of charge-discharge experiments were conducted using the battery of FIG. 3.

Several materials were tested as positive electrodes. These were:
- titanium sheet
- platinised titanium sheets
- graphite rods and plates
- carbon fibre material (non-woven, type CFT-3000, Ahlstroem, Finland)
- cellulose carbon knit (GF-20, Nikon Carbon Co. Ltd. Japan)
- dimensionally stable anode ($IrO_2$ on Titanium-Diamond Shamrock)

Sulphonated polyethylene anion-selective type membranes and polystyrene sulphonic acid cation-selective type membranes were also tested. The electrolyte composition ranged from 0.1M to 2M vanadyl sulphate $VOSO_4$ in 1.0M to 2.0M sulphuric acid, the same solution being used for both anodic and cathodic half-cells. The current density varied from 10 mA/cm$^2$ to 25 mA/cm$^2$ depending on the concentration of electrolyte and the materials used as electrodes and ionically conducting separator.

During initial charging, the following redox reactions take place:

Positive electrode $V^{4+} \rightarrow V^{5+} + e^-$
Negative electrode $V^{4+} + 2e^- \rightarrow V^{2+}$ Subsequent charge-discharge reactions, however, are:

Positive electrode 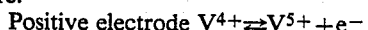
Negative electrode 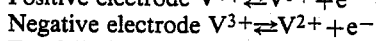

For full charging of the negative electrolyte during the first charge, twice the number of coulombs are required as for the positive electrolyte. To avoid overcharging of the positive half-cell and oxygen generation, therefore, when the positive half-cell electrolyte was fully charged, it was replaced by a new portion of uncharged solution and charging continued.

During charging, nitrogen was bubbled through the negative half cell solution to remove dissolved oxygen and to stop diffusion of air into the compartment. Removal of oxygen prevented reoxidation of reduced electrolyte. In practice this will not be needed if the cell is airtight.

Average experimental conditions for charging were as follows:

Initial Electrolyte: 2M $VOSO_4$ in 2M $H_2SO_4$
Temperature: 20° C.
Electrodes
   Negative: graphite plate
   Positive: various materials as specified above
   Electrode Area: 15 $cm^2$ [3 cm×5 cm]
   Current Density: 10 $mA/cm^2$ to 25 $mA/cm^2$
   Voltage: 2.2 to 2.9 V for full charge More oxygen and hydrogen evolution could be observed on the electrodes when the cell was almost fully charged. The average charging efficiency was over 90%. The stability of the open circuit cell voltage after full charging was tested and the potential remained constant at 1.3 V±0.05 V for 72 hours.

Current efficiency during discharge varied for different electrode materials and membranes. At a discharge current density of 25 $mA/cm^2$ efficiency was over 90%, up to a state-of-discharge of 70%. High efficiencies at over 70% state-of-discharge should be possible with improved cell design and electrolyte pumping. Reproducibility of results obtained with different electrolyte concentrations was good.

Stability tests were performed on the reduced and oxidised electrolytes over the temperature range −5° C. to +60° C. No accelerated decomposition at high temperatures, nor crystallisation at low temperatures was observed.

The results are summarised below: titanium sheet proved unsuitable because of its anodic passivation with formation of a high electrically resistant surface layer.

Platinised titanium mesh did not exhibit this problem and performed well both as anode and cathode. No chemical attack was observed.

Although the graphite rods and plates showed acceptable reaction rates for the vanadium species, these materials were not resistant in the oxidising solution during the charging cycle. After several charge-discharge cycles the surface of the graphite appeared "etched" and a fine dispersion of carbon particles was observed in the positive electrolyte. The negative electrode remained unchanged after several experiments.

Similar mechanical disintegration was observed with the carbon fibre. The anode was oxidised especially in the area of the highest current density. The fifth electrode material tested was the carbon cloth, GF-20. The material was fastened to the graphite plate and tested as an anode. No noticeable attack was observed on the surface of the cloth but disintegration of the underlying graphite was evident.

Of the materials tested, the dimensionally stable anode ($IrO_2$ on Ti) appears to be particularly suitable for the positive electrode of the vanadium cell.

Two types of ion selective membranes were tested for suitability as ionically conducting separators. These were sulphonated polyethylene and polystyrene sulphonic acid.

The sulphonated polyethylene anion—selective type membrane performed well. After several experiments, however, it changed its colour and consistency. It became more rigid and harder, and its electrical resistivity increased.

The polystyrene sulphonic acid cation—selective type membrane had better electrical properties. Its resistivity was lower and there was no noticeable change after 100 hours of testing.

EXAMPLE 2

A laboratory-scale redox battery as shown in FIG. 3 was designed and constructed to test the performance of the V(II)/V(III) and V(IV)/V(V) half-cells in an all-vanadium redox battery.

The cell consists of two separate compartments, an anodic and cathodic compartment separated by an ion-selective membrane. The capacity of each compartment was approximately 100 ml. Both half-cells have water-jackets for temperature control.

Figure 4:
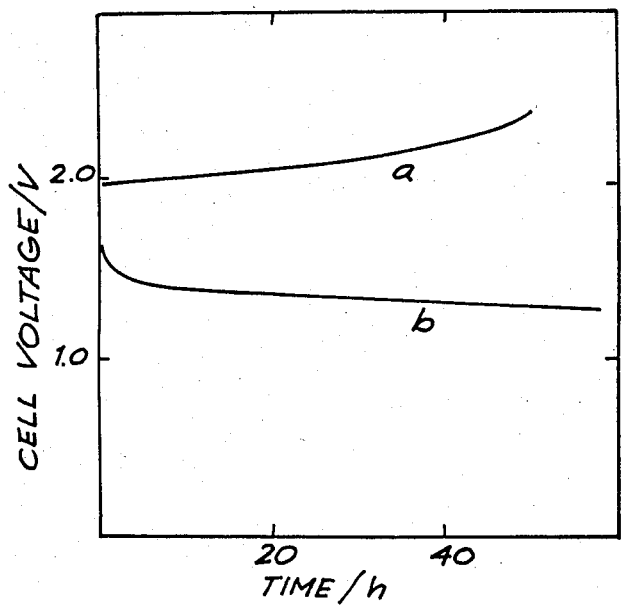
FIG. 4 is a plot of cell voltage characteristics of a typical redox battery of Example 2 in which: a-change of voltage during charging; b-stability of open circuit voltage of charged cell.

Graphite plates were used as electrodes and the membrane was sulphonated polyethylene anion-selective material. The anolyte and catholyte half-cell electrolytes included 0.1M V(III) and 0.1M V(IV) in 2M $H_2SO_4$ respectively. A typical charge-discharge curve is shown in FIG. 4.

The cell was charged at a current density of 3 $mA/cm^2$ and the voltage varied from 2.1 V to 2.4 V for full charge. Minor oxygen and hydrogen evolution could be observed on the electrodes when the cell was almost fully charged. The average charging efficiency was over 90%. The stability of the open circuit cell voltage after full charging, was tested over 72 hours and the potential remained constant at 1.3 V±0.05 V.

At a discharge current density of 3 $mA/cm^2$, the current efficiency was over 90%, up to a state-of-discharge of 70%. It is emphasized, however, that the cell design was far from optimum, and high efficiencies at over 70% state-of-discharge should be possible with improved design and electrolyte pumping.

Stability tests on the reduced and oxidized electrolytes over the temperature range −5° C. to 60° C., showed no accelerated decomposition at high temperatures, nor crystallization at the lower temperatures. A slow deterioration of the positive electrode and the membrane was, however, observed after prolonged usage. Thus, although the grahite plates showed acceptable reaction rates for the vanadium species, they were not resistant in the oxidizing solution during the charging cycles. After several charge-discharge cycles, the surface of the graphite appeared "etched" and a fine dispersion of carbon articles was observed in the positive ½-cell electrolyte. The negative electrode remained unchanged after several experiments.

The sulphonated polyethylene membrane material used in the test cell also deteriorated with time. Although it performed well, maintained a constant open-circuit voltage for over 70 hours, after several experiments, it changed its colour and consistency. It became more rigid and harder, and its electrical resistivity increased.

EXAMPLE 3

Figure 5:
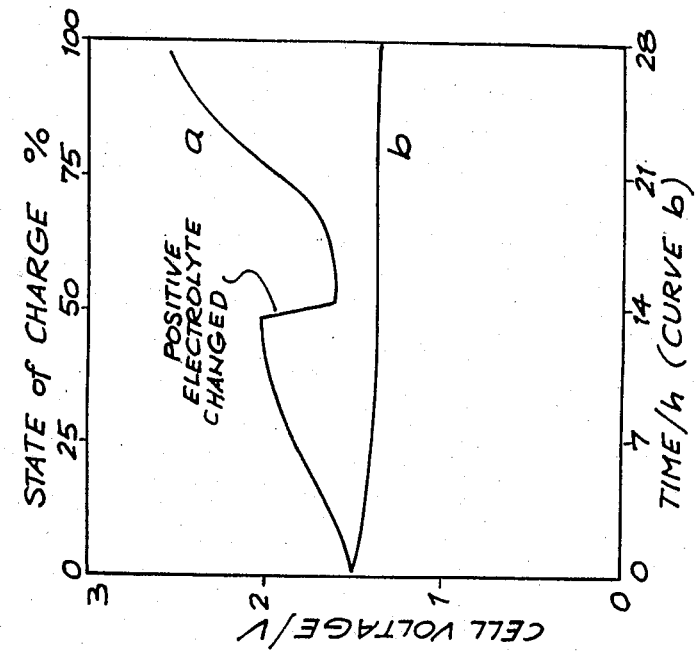
FIG. 5 is a graph of cell voltage characteristics of the redox battery of Example 3 in which: a-change of voltage during charging; b-stability of open circuit voltage of charge cell.

The redox battery of FIG. 3 was tested under the following experimental conditions:
Initial Electrolyte: 2M $VOSO_4$ in 2M $H_2SO_4$
Temperature: 25° C.
Electrodes
  Negative: graphite plate
  Positive: graphite plate
Electrode Dimensions: $40 \times 32 \times 7$ mm$^3$
Current Density: 8 mA/cm$^2$ (for charging)
Ionically Conducting
  Separator: CMV polystyrene suphonic acid, cationic type The first charging curve of the redox battery is shown as curve (a) in FIG. 5. Curve (b) illustrates that the open circuit voltage of the redox battery was relatively stable over 28 hours.

EXAMPLE 4

Figure 6:
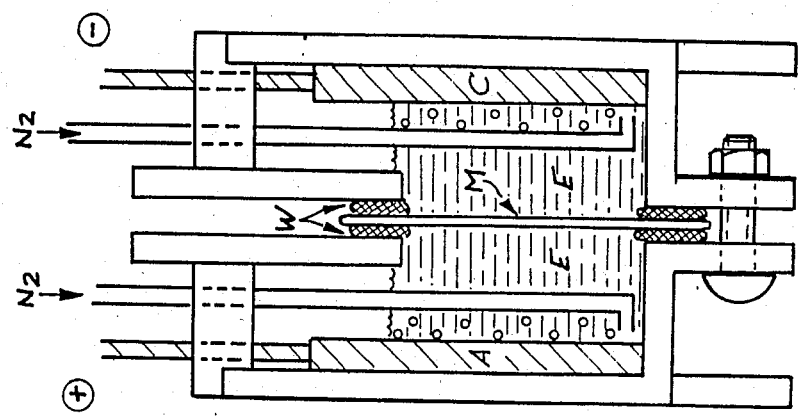
FIG. 6 is a diagram of modified laboratory scale cell showing provision for $N_2$ bubbling and smaller anode cathode distance, these reducing concentration polarization and iR losses A-anode, C-cathode, W-washers, M-membrane, E-anolyte or catholyte.

The cell of FIG. 6 was tested under the following experimental conditions:
Initial Electrolyte: 2M $VOSO_4$ in 2M $H_2SO_4$
Temperature: 25° C.
Electrodes
  A. Curves (a) and (b) FIG. 7
    Negative: graphite plate
    Positive: graphite plate
  B. Curves (a') and (b') FIG. 7
    Negative: graphite plate
    Positive: dimensionally stable anode—Iridium dioxide on Titanium (Diamond Shamrock)
Current Density: 6 mA/cm$^2$ (for charging and discharging)
Ionically Conducting
  Separator: CMV polystyrene sulphonic acid cationic type (Asahi Glass Co., Japan)

Figure 7:
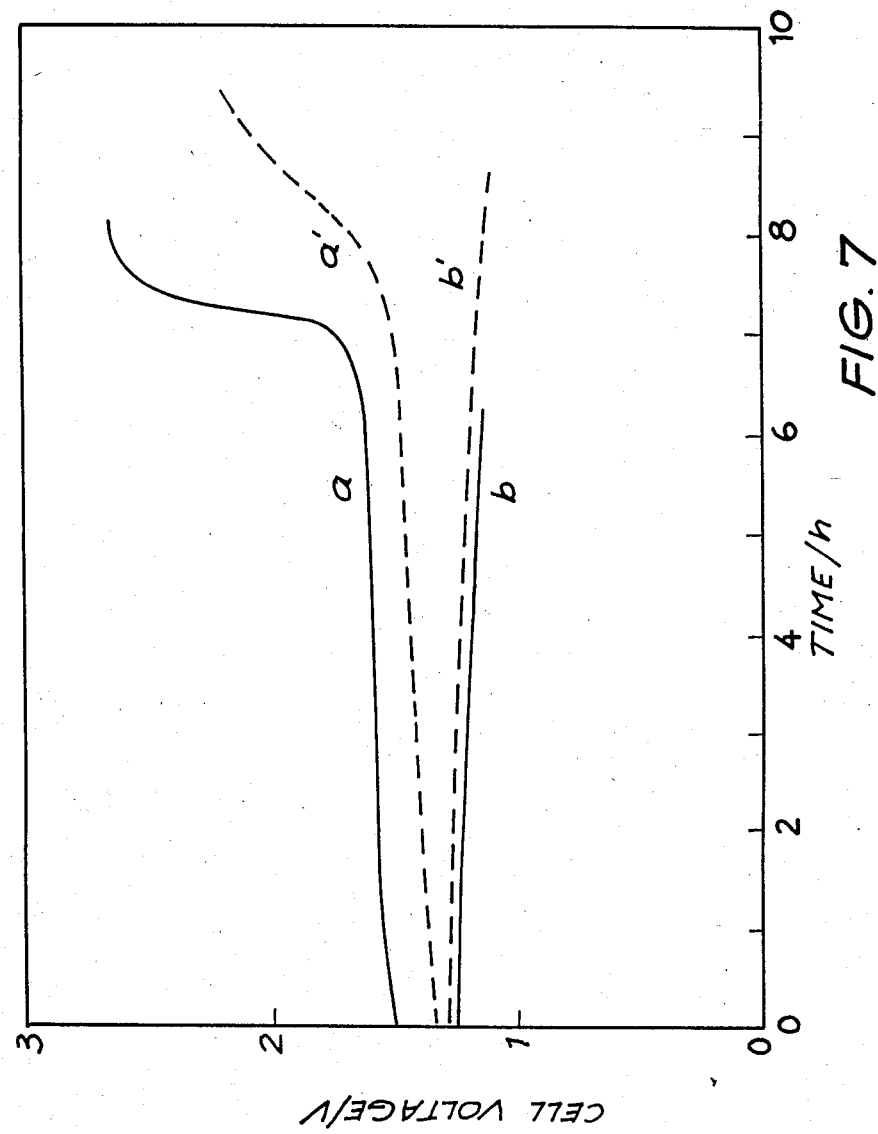
FIG. 7: Curves (a) and (b) correspond to charging and discharging curves respectively for cell employing 2M $VOSO_4$ and 2M $H_2SO_4$, a Selemion CMV cation-selective membrane (Asahi Glass Co. Japan) and graphite plate electrodes.

On comparing curves (a) and (b) with curves (a') and (b') in FIG. 7 it can be seen that for the latter curves a lower charging voltage is required due to decreased over-voltage for pentavalent/tetravalent vanadium redox reaction at the dimensionally stabilized anode as compared with the graphite plate electrode. The dimensionally stable anode remained stable after several charge-discharge cycles, while the graphite postive plates showed signs of mechanical disintergration even after the first charge cycle

What we claim is:

1. An uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing tetravalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M.

2. The battery as defined in claim 1 wherein y is 1 and X is selected from $SO_4$ or O.

3. The battery as defined in claim 1 wherein said catholyte includes a salt of the formula $VOSO_4$.

4. The battery as defined in claim 3 wherein the concentration of said salt is from 0.25M to 2.0M.

5. The battery as defined in claim 3 wherein the concentration of said salt is from 0.25M to 2.5M.

6. The battery as defined in claim 1 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

7. The battery as defined in claim 1 wherein said electrolyte is 0.01M to 5.0M $H_2SO_4$.

8. The battery as defined in claim 1 wherein said positive electrode and said negative electrode are selected from dimensionally stabilized anodes including $TiO_2$, $RuO_2$ or $IrO_2$ or combinations thereof on titanium, $RuO_2$, $TiO_2$, $IrO_2$, Pt, Au, Pd, conductive polymer coatings, graphite, glassy carbon, non-woven carbon fibre material or cellulose, carbon knit, and said ionically conducting separator is selected from a sulfonated polyethylene membrane or a polystyrene sulfonic acid membrane.

9. The battery as defined in claim 1 wherein at least one of said negative compartment and said positive compartment is sealed air-tight and said catholyte is de-aerated.

10. The battery as defined in claim 3 wherein the concentration of said salt is from 0.5M to 2.25M.

11. The battery as defined in claim 3 wherein the concentration of said salt is from 1.0M to 2M.

12. The battery as defined in claim 3 wherein the concentration of said salt is from 1.5M to 2M.

13. The battery as defined in claim 1 wherein said anolyte includes a salt of the formula $VO(X)_y$ where y is 2 and X is selected from $SO_4$ or O and the concentration of said salt is from 0.25M to 5.0M.

14. The battery as defined in claim 1 wherein said anolyte includes from 0.25M to 2.5M of a salt of the formula $VOSO_4$ in from 0.25M to 3.5M $H_2SO_4$.

15. The battery as defined in claim 1 wherein said anolyte and said catholyte include a salt of the formula $VOSO_4$ in a concentration from 0.25M to 3.5M and said electrolyte is 0.25M to 3.5M $H_2SO_4$.

16. The battery as defined in claim 14 wherein said negative and positive compartments are sealed air tight.

17. The battery as defined in claim 14 wherein said negative and positive compartments are deaerated.

18. An uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing trivalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M.

19. The battery as defined in claim 18 wherein y is 1 and X is selected from $SO_4$ or O.

20. The battery as defined in claim 18 wherein said catholyte includes a salt of the formula $VOSO_4$.

21. The battery as defined in claim 20 wherein the concentration of said salt is from 0.25M to 2.0M in 0.25M to 3.5M $H_2SO_4$.

22. The battery as defined in claim 20 wherein the concentration of said salt is from 0.25M to 2.5M in 0.25M to 3.5M $H_2SO_4$.

23. The battery as defined in claim 18 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

24. The battery as defined in claim 18 wherein said electrolyte is 0.01M to 5.0M $H_2SO_4$.

25. The battery as defined in claim 18 wherein said positive electrode and said negative electrode are selected from dimensionally stabilized anodes including $TiO_2$, $RuO_2$ or $IrO_2$ or combinations thereof on titanium, $RuO_2$, $TiO_2$, $IrO_2$, Pt, Au, Pd, conductive polymer coatings, graphite, glassy carbon, non-woven carbon fiber material or cellulose, carbon knit, and said ionically conducting separator is selected from a sulfonated polyethylene membrane or a polystyrene sulfonic acid membrane.

26. The battery as defined in claim 18 wherein at least one of said negative compartment and said positive compartment is sealed air-tight and said catholyte is deaerated.

27. The battery as defined in claim 20 wherein the concentration of said salt is from 0.5M to 2.25M.

28. The battery as defined in claim 20 wherein the concentration of said salt is from 1.0M to 2M.

29. The battery as defined in claim 20 wherein the concentration of said salt is from 1.5M to 2M.

30. The battery as defined in claim 27 wherein said electrolyte is from 0.25M to 3.5M $H_2SO_4$.

31. The battery as defined in claim 28 wherein said electrolyte is from 0.25M to 3.5M $H_2SO_4$.

32. The battery as defined in claim 29 wherein said electrolyte is from 0.25M to 3.5M $H_2SO_4$.

33. The battery as defined in claim 31 wherein said negative and positive compartments are sealed air tight.

34. The battery as defined in claim 32 wherein said negative and positive compartment are deaerated.

35. An all-vanadium redox battery having a negative compartment containing an anolyte in electrical contact with a negative electrode, said anolyte comprising an electrolyte containing divalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween.

36. The battery as defined in claim 35 wherein the concentration of said pentavalent vanadium ions is from 0.25M to 2.0M.

37. The battery as defined in claim 35 wherein the concentration of said pentavalent vanadium ions is from 0.25M to 2.5M.

38. The battery as defined in claim 35 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

39. The battery as defined in claim 35 wherein said electrolyte is 0.01M to 5.0M $H_2SO_4$.

40. The battery as defined in claim 35 wherein said positive electrode and said negative electrode are selected from dimensionally stabilized anodes including $TiO_2$, $RuO_2$ or $IrO_2$ or combinations thereof on titanium, $RuO_2$, $TiO_2$, $IrO_2$, Pt, Au, Pd, conductive polymer coatings, graphite, glassy carbon, non-woven carbon fiber material or cellulose, carbon knit, and said ionically conducting separator is selected from a sulfonated polyethylene membrane or a polystyrene sulfonic acid membrane.

41. The battery as defined in claim 35 wherein at least one of said negative compartment and said positive compartment is sealed air-tight and said catholyte is deaerated.

42. The battery as defined in claim 39 wherein the concentration of said pentavalent vanadium ions is from 0.5M to 2.25M.

43. The battery as defined in claim 39 wherein the concentration of said pentavalent vanadium ions is from 1.0M to 2M.

44. The battery as defined in claim 39 wherein the concentration of said pentavalent vanadium ions is from 1.5M to 2M.

45. The battery as defined in claim 42 wherein said electrolyte is from 0.25M to 3.5M $H_2SO_4$.

46. The battery as defined in claim 43 wherein said electrolyte is from 0.25M to 3.5M $H_2SO_4$.

47. The battery as defined in claim 44 wherein said electrolyte is from 0.25M to 3.5M $H_2SO_4$.

48. The battery as defined in claim 35 wherein said negative and positive compartments are sealed air-tight.

49. The battery as defined in claim 35 wherein said negative and positive compartments are deaerated.

50. An all-vanadium redox battery having a negative compartment containing an anolyte in electrical contact with a negative electrode, said anolyte comprising an electrolyte containing trivalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween.

51. The battery as defined in claim 50 wherein the concentration of said pentavalent vanadium ions is from 0.25M to 2.0M.

52. The battery as defined in claim 50 wherein the concentration of said pentavalent vanadium ions is from 0.25M to 2.5M.

53. The battery as defined in claim 50 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

54. The battery as defined in claim 50 wherein said electrolyte is 0.01M to 5.0M $H_2SO_4$.

55. The battery as defined in claim 50 wherein said positive electrode and said negative electrode are selected from dimensionally stabilized anodes including $TiO_2$, $RuO_2$ or $IrO_2$ or combinations thereof on titanium $RuO_2$, $TiO_2$, $IrO_2$, Pt, Au, Pd, conductive polymer coatings, grahite, glassy carbon, non-woven carbon fiber material or cellulose, carbon knit, and said ionically conducting separator is selected from a sulfonated polyethylene membrane or a polystyrene sulfonic acid membrane.

56. The battery as defined in claim 50 wherein at least one of said negative compartment and said positive compartment is sealed air-tight and said catholyte is deaerated.

57. The battery as defined in claim 54 wherein the concentration of said pentavalent vanadium ions is from 0.5M to 2.25M.

58. The battery as defined in claim 54 wherein the concentration of said pentavalent vanadium ions is from 1.0M to 2M.

59. The battery as defined in claim 54 wherein the concentration of said pentavalent vanadium ions is from 1.5M to 2M.

60. The battery as defined in claim 57 wherein said electrolyte is from 0.25M to 3.5M $H_2SO_4$.

61. The battery as defined in claim 58 wherein said electrolyte is from 0.25M to 3.5M $H_2SO_4$.

62. The battery as defined in claim 59 wherein said electrolyte is from 0.25M to 3.5M $H_2SO_4$.

63. The battery as defined in claim 50 wherein said negative and positive compartments are sealed air tight.

64. The battery as defined in claim 50 wherein said negative and positive compartments are deaerated.

65. An all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing divanlent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M.

66. The battery as defined in claim 65 wherein y is 1 and X is selected from $SO_4$ or O.

67. The battery as defined in claim 65 wherein said catholyte includes a salt of the formula $VOSO_4$.

68. The battery as defined in claim 65 wherein the concentration of said salt is from 0.25M to 2.0M.

69. The battery as defined in claim 65 wherein the concentration of said salt is from 0.25M to 2.5M.

70. The battery as defined in claim 65 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

71. The battery as defined in claim 65 wherein said electrolyte is 0.01M to 5.0M $H_2SO_4$.

72. The battery as defined in claim 65 wherein said positive electrode and said negative electrode are selected from dimensionally stabilized anodes including $TiO_2$, $RuO_2$ or $IrO_2$ or combinations thereof on titanium, $RuO_2$, $TiO_2$, $IrO_2$, Pt, Au, Pd, conductive polymer coatings, graphite, glassy carbon, non-woven carbon fiber material or cellulose, carbon knit, and said ionically conducting separator is selected from a sulfonated polyethylene membrane or a polystyrene sulfonic acid membrane.

73. The battery as defined in claim 65 wherein at least one of said negative compartment and said positive compartment is sealed air-tight and said catholyte is deaerated.

74. The battery as defined in claim 67 wherein the concentration of said salt is from 0.5M to 2.25M.

75. The battery as defined in claim 67 wherein the concentration of said salt is from 1.0M to 2M.

76. The battery as defined in claim 67 wherein the concentration of said salt is from 1.5M to 2M.

77. The battery as defined in claim 74 wherein said electrolyte is from 0.25M to 3.5M $H_2SO_4$.

78. The battery as defined in claim 75 wherein said electrolyte is from 0.25M to 3.5M $H_2SO_4$.

79. The battery as defined in claim 76 wherein said electrolyte is from 0.25M to 3.5M $H_2SO_4$.

80. The battery as defined in claim 65 wherein said negative and positive compartments are sealed air-tight.

81. The battery as defined in claim 65 wherein said negative and positive compartments are deaerated.

82. An all-vanadium redox battery having a negative compartment containing an anolyte in electrical contact with a negative electrode, said anolyte comprising an electrolyte containing tetravalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween.

83. The battery as defined in claim 82 wherein the concentration of said pentavalent vanadium ions is from 0.25M to 2.0M.

84. The battery as defined in claim 82 wherein the concentration of said pentavalent vanadium ions is from 0.25M to 2.5M.

85. The battery as defined in claim 82 wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof.

86. The battery as defined in claim 82 wherein said electrolyte is 0.01M to 5.0M $H_2SO_4$.

87. The battery as defined in claim 82 wherein said positive electrode and said negative electrode are selected from dimensionally stabilized anodes including $TiO_2$, $RuO_2$ or $IrO_2$ or combinations thereof on titanium, $RuO_2$, $TiO_2$, $IrO_2$, Pt, Au, Pd, conductive polymer coatings graphite, glassy carbon, non-woven carbon fiber material or cellulose, carbon knit, and ionically conducting separator is selected from a sulfonated polyethylene membrane or a polystyrene sulfonic acid membrane.

88. The battery as defined in claim 82 wherein at least one of said negative compartment and said positive compartment is sealted air-tight and said catholyte is deaerated.

89. The battery as defined in claim 82 wherein the concentration of said pentavalent vanadium ions is from 0.5M to 2.25M.

90. The battery as defined in claim 82 wherein the concentration of said pentavalent vanadium ions is from 1.0M to 2M.

91. The battery as defined in claim 82 wherein the concentration of said pentavalent vanadium ions is from 1.5M to 2M.

92. The battery as defined in claim 89 wherein said electrolyte is from 0.25M to 3.5M $H_2SO_4$.

93. The battery as defined in claim 90 wherein said electrolyte is from 0.25M to 3.5M $H_2SO_4$.

94. The battery as defined in claim 91 wherein said electrolyte is from 0.25M to 3.5M $H_2SO_4$.

95. The battery as defined in claim 82 wherein said negative and positive compartments are sealed air-tight.

96. The battery as defined in claim 82 wherein said negative and positive compartments are deaerated.

97. The battery as defined in claim 90 wherein said electrolyte is from 0.25M to 3.5M $H_2SO_4$.

98. The battery as defined in claim 91 wherein said electrolyte is from 0.25M to 3.5M $H_2SO_4$.

99. An all-vanadium redox battery system comprising an uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing tetravalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

100. An all-vanadium redox battery system comprising an uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing tetravalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof and further including an anolyte charge reservoir having anolyte charge supply and at least one return line for charging further anolyte which is to be delivered to said negative compartment and a catholyte charge reservoir having catholyte charge supply and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge line and with at least one of said catholyte storage lines and said catholyte charge line for pumping:
  (i) said catholyte through the catholyte storage line, said positive compartment and said catholyte charge line; and
  (ii) said anolyte solution through said anolyte solution storage line, said negative compartment and said anolyte solution charge line.

101. An all-vanadium redox battery system comprising an uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing trivalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br, or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

102. An all-vanadium redox battery system comprising an uncharged all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing trivalent vanadium ions, and an ionically conducting separator disosed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof, and further including an anolyte charge reservoir having anolyte charge supply and at least one return line for charging further anolyte which is to be delivered to said negative compartment and a catholyte charge reservoir having catholyte charge supply and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge line and with at least one of said catholyte storage lines and said catholyte charge line for pumping:
  (i) said catholyte through the catholyte storage line, said positive compartment and said catholyte charge line; and
  (ii) said anolyte solution through said anolyte solution storage line, said negative compartment and said anolyte solution charge line.

103. An all-vanadium redox battery system comprising an all-vanadium redox battery having a negative compartment containing an anolyte in electrical contact with a negative electrode, said anolyte comprising an electrolyte containing divalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

104. An all-vanadium redox battery system comprising an all-vanadium redox battery having a negative compartment containing an anolyte in electrical contact with a negative electrode, said anolyte comprising an electrolyte containing divalent vanadium ions; a positive compartment containing a catholyte in electrical contact with a positive electrodes, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof, and further including an anolyte charge reservoir having anolyte charge supply and at least one return line for charging further anolyte which is to be delivered to said negative compartment and a catholyte charge reservoir having catholyte charge supply and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge lines and with at least one of said catholyte storage lines and said catholyte charge line for pumping;
  (i) said catholyte through the catholyte storage line, said positive compartment and said catholyte charge line; and
  (ii) said anolyte solution through said anolyte solution storage line, said negative compartment and said anolyte solution charge line.

105. An all-vanadium redox battery system comprising an all-vanadium redox battery having a negative compartment containing an anolyte in electrical contact with a negative electrode, said anolyte comprising an electrolyte containing trivalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

106. An all-vanadium redox battery system comprising an all-vanadium redox battery having a negative compartment containing an anolyte in electrical contact with a negative electrode, said anolyte comprising an electrolyte containing trivalent vanadium ions; a positive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof and further including an anolyte charge reservoir having anolyte charge supply and at least one return line for charging further anolyte which is to be delivered to said negative compartment and a catholyte charge reservoir having catholyte charge supply and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge line and with at least one of said catholyte storage lines and said catholyte charge line for pumping:
  (i) said catholyte through the catholyte storage line, said positive compartment and said catholyte charge line; and (ii) said anolyte solution through said anolyte solution storage line, said negative compartment and said anolyte solution charge line.

107. An all-vanadium redox battery system comprising an all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing divalent vanadium ions, and an ionically conducting separator disposed between said positive compartment and said negative compartment and in contact with said catholyte and said anolyte to provide ionic commmunication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

108. An all-vanadium redox battery system comprising an all-vanadium redox battery having a positive compartment containing a catholyte in electrical contact with a positive electrode, said catholyte comprising an electrolyte containing tetravalent vanadium ions, a negative compartment containing an anolyte in electrical contact with a negative electrode, said anolyte comprising an electrolyte containing divalent vanadium ions, and an ionically conducting separator disposed between said positive compartment and said negative compartment and in contact with said catholyte and said anolyte to provide ionic communication therebetween and wherein said catholyte includes a salt of the formula $VO(X)_y$ where y is 2 and X is selected from F, Br or Cl or y is 1 and X is selected from $SO_4$ or O and the concentration of said salt is from 0.25M to 5.0M and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof and further including an anolyte charge reservoir having anolyte charge supply and at least one return line for charging further anolyte which is to be delivered to said negative compartment and a catholyte charge reservoir having catholyte charge supply, and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge line and with at least one of said catholyte storage lines and said catholyte charge line for pumping:

(i) said catholyte through the catholyte storage line, said positive compartment and said catholyte charge line; and
(ii) said anolyte solution through said anolyte solution storage line, said negative comparment and said anolyte solution charge line.

109. An all-vanadium redox battery system comprising an all-vanadium redox battery having a negative compartment containing an anolyte in electrical contact with a negative electrode, said anolyte comprising an electrolyte containing tetravalent vanadium ions; a ositive compartment containing a catholyte in electrical contact with a positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$ or mixtures thereof, and further including an anolyte reservoir for further anolyte having anolyte supply and return lines between said anolyte reservoir and said negative compartment, a catholyte reservoir for further catholyte having catholyte supply and return lines between said catholyte reservoir and said positive compartment; and pumping means associated with said anolyte lines and with said catholyte lines for pumping said anolyte between said negative compartment and said anolyte reservoir and for pumping said catholyte between said positive compartment and said catholyte reservoir.

110. An all-vanadium redox battery system comprising an all-vanadium redox battery having a negative compartment containing an anolyte in electrical contact with a negative electrode, said anolyte comprising an electrolyte containing tetravalent vanadium ions; a positive compartment containing a catholyte in electrical contact with positive electrode, said catholyte comprising an electrolyte containing 0.25M to 5.0M pentavalent vanadium ions; and an ionically conducting separator disposed between said positive and negative compartments and in contact with said catholyte and said anolyte to provide ionic communication therebetween and wherein said electrolyte is selected from an aqueous solution of $H_2SO_4$, $Na_2SO_4$, $K_2SO_4$, $H_3PO_4$, $Na_3PO_4$, $K_3PO_4$, $HNO_3$, $KNO_3$, $NaNO_3$ or mixtures thereof and further including an anolyte charge reservoir having anolyte charge supply and at least one return line for charging further anolyte which is to be delivered to said negative compartment and a catholyte charge reservoir having catholyte charge supply and at least one return line for charging further catholyte which is to be delivered to said positive compartment, an anolyte storage reservoir having anolyte storage supply and at least one return line for storing anolyte from said negative compartment and a catholyte storage reservoir having catholyte storage supply and at least one return line for storing catholyte from said positive compartment and pumping means associated with at least one of said anolyte storage lines and said anolyte charge line and with at least one of said catholyte storage lines and said catholyte charge line for pumping;

(i) said catholyte through the catholyte storage line, said positive compartment and said catholyte charge line; and
(ii) said anolyte solution through said anolyte solution storage line, said negative compartment, and said anolyte solution charge line.

* * * * *

UNITED STATES PATENT AND TRADEMARK OFFICE
CERTIFICATE OF CORRECTION

PATENT NO. : 4,786,567
DATED : November 22, 1988
INVENTOR(S) : Maria Skyllas-Kazacos et al.

It is certified that error appears in the above-identified patent and that said Letters Patent is hereby corrected as shown below:

Title page:

Delete "Miron Rychick
      Bankstown, Australia" from the list of inventors.

Signed and Sealed this

Third Day of October, 1989

Attest:

DONALD J. QUIGG

Attesting Officer

Commissioner of Patents and Trademarks